United States Patent [19]
MacNiel

[11] Patent Number: 5,214,293

[45] Date of Patent: May 25, 1993

[54] LATCH STATUS SENSOR SENSING CLOSED AND UNLATCHED POSITION

[75] Inventor: Douglas K. MacNiel, Costa Mesa, Calif.

[73] Assignee: CalComp Inc., Anaheim, Calif.

[21] Appl. No.: 869,159

[22] Filed: Apr. 14, 1992

[51] Int. Cl.$^5$ .................... G01N 21/86; G01D 5/34; G08B 13/18

[52] U.S. Cl. .................... 250/561; 250/229; 340/556

[58] Field of Search .............. 250/229, 231.19, 231.1, 250/221, 222.1, 230, 227.21, 227.22, 561; 341/31; 340/555–557

[56] References Cited

U.S. PATENT DOCUMENTS

| | | | |
|---|---|---|---|
| 4,032,158 | 6/1977 | Stanwell-Smith et al. | 250/230 |
| 4,540,269 | 9/1985 | Nishiyama | 250/221 |
| 4,564,085 | 1/1986 | Melocik et al. | 250/222.1 |
| 4,841,283 | 6/1989 | Bubliewicz | 250/229 |
| 4,870,290 | 9/1989 | Deck | 250/561 |
| 4,943,715 | 7/1990 | Konishi | 250/229 |
| 5,021,676 | 6/1991 | Dragon et al. | 250/561 |

Primary Examiner—David C. Nelms
Assistant Examiner—Michael Messinger
Attorney, Agent, or Firm—Donald A. Streck; Wm. F. Porter, Jr.

[57] ABSTRACT

In a push-to-release latch connected to a door/lid revolving about an axis of rotation of a cabinet between open, closed and unlatched, and closed and latched positions wherein the closed and unlatched and closed and latched positions are rotationally displaced from one another, apparatus for determining the status of the latch without sensing the latch. A reflector is carried by the door/lid or the cabinet and a non-contacting optical sensor carried by the other for directing a beam of light from an emitter, for receiving the beam of light as reflected by the reflector, and for outputting an electrical signal at an output thereof as a function of reflected light. The reflector and the non-contacting optical sensor are positioned such that the beam of light strikes the reflector to be reflected thereby when the door/lid is in a closed and latched position and the beam of light does not strike the reflector to be reflected thereby when the door/lid is in a closed and unlatched position. The reflectors and optical sensors can be employed at side edges of a lid with side latching to detect skewed closing thereof when one latch is latched and the other is not.

20 Claims, 4 Drawing Sheets

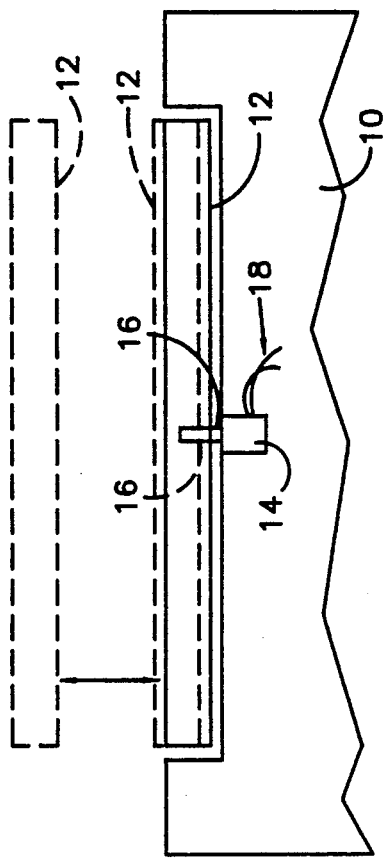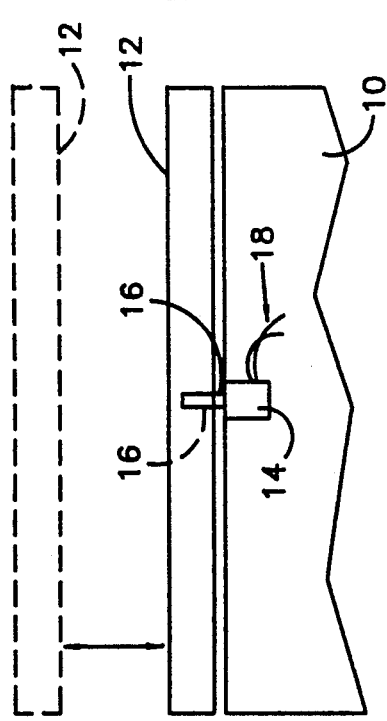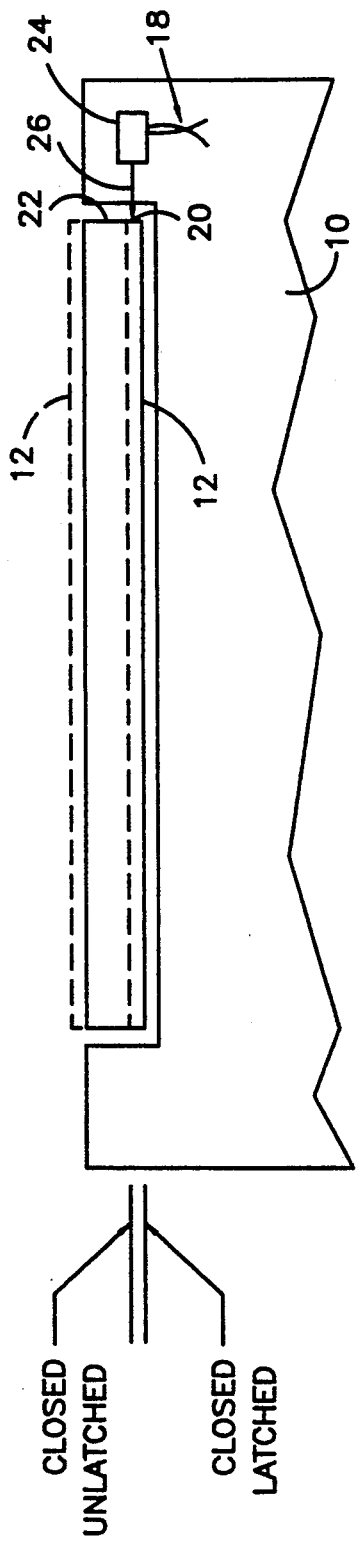

LATCH STATUS SENSOR SENSING CLOSED AND UNLATCHED POSITION

BACKGROUND OF THE INVENTION

This invention relates to position sensors and, more particularly, in a lid latched at a pair of side edges and revolving about a horizontal axis of rotation between open, closed and unlatched, and closed and latched positions wherein the closed and unlatched and closed and latched positions are rotationally displaced from one another, to a method of determining the status of both of a pair of latches releasably latching the lid without physically sensing either of the pair of latches. The method comprises the steps of, providing a pair of reflectors carried by one of the lid and the cabinet adjacent respective ones of the pair of latches; providing a pair of non-contacting optical sensors each including a light detector carried by another of the lid and the cabinet adjacent respective ones of the pair of latches for directing a beam of light from an emitter thereof; positioning each of the pair of reflectors and the pair of non-contacting optical sensors such that the beam of light strikes the reflector to be reflected thereby at an input surface of the light detector when the lid adjacent an associated latch is in a closed and latched position and the beam of light does not strike the reflector to be reflected thereby at the input surface of the light detector when the lid adjacent the associated latch is in a closed and unlatched position; emitting the beam of light from the emitter of the optical sensors; receiving the beam of light if reflected by the reflector at the input surface of the light detectors; and, outputting electrical signals as a function of light striking the input surfaces whereby the status of the latches is directly related to the electrical signals.

Cabinets with doors and lids are used in various environments. A cabinet 10 with a lid 12 is depicted in simplified form in FIG. 1. As is typical in such cases, the lid 12 moves between an open position (shown ghosted) and a closed position. The position of the lid 12 can be sensed reliably with a sensor 14 having a spring-loaded plunger 16 since the lid 12 is either open or closed. The position of the plunger 16 (extended or retracted) is output on the wires 18. Thus, the wires 18 can be connected to be sensed by a control circuit, light a warning light, or whatever is needed under the circumstances. When the lid 12 is lifted to the open position, the plunger 16 extends and an open condition is indicated by the sensor 14. When the lid 12 is lowered to the closed position, it compresses the plunger 16 and a closed condition is indicated by the sensor 14. If a friction or magnetic catch is employed to hold the lid 12 in the closed position, it does not affect the sensor 14.

In a wide lid or the like, two latches may be employed with one at each side. A sensor such as sensor 14 cannot detect when one side of the lid is closed and latched and the other is closed and slightly ajar, i.e. not latched.

In some instances, however, a lid or door cannot be securely held in a closed position with a friction or magnetic catch since such devices will release upon sufficient opening force being applied. Typically, the opening force required to release a friction or magnetic catch is quite small. Where a lid or door must be securely held in a closed position and it is still desired to be able to open and close the lid or door securely, a push-to-release latch is employed. As depicted in FIG. 2, a push-to-release latch has two stable closed positions. One position (in which the lid 12 is shown ghosted) is where the lid 12 is closed but not latched. The other (non-ghosted lid 12) is where the lid 12 is both closed and latched. The operation of such latches is well known to those skilled in the art and they do not form any part of the present invention; so, the push-to-release latch is not depicted in the drawings for simplicity. To close and latch a push-to-release latch, the lid 12 is moved to the ghosted position of FIG. 2. The lid 12 is then pushed more firmly towards the closed position against a bias force of the push-to-release latch. In latching, the lid 12 actually passes to an overtravel position (shown in FIG. 4) causing the latch within the push-to-release latch to engage. When the closing pressure on the lid 12 is released, the lid 12 moves to the non-ghosted position of FIG. 2 where it is closed and latched. To release the push-to-release latch so that the lid 12 can be opened, the lid 12 is again pushed firmly towards the closed position against the bias force of the push-to-release latch until it reaches the overtravel position, at which the latch within the push-to-release latch disengages. When the pressure on the lid 12 is released, the lid 12 moves to the ghosted position of FIG. 2 where it is closed and unlatched. It can then be raised to its open position. A door operating with a push-to-release latch operates in the same manner except that the motion of the door is about a vertical axis of rotation while a lid moves about a horizontal axis of rotation.

The above-mentioned condition of the lid 12 being closed and latched on one side and being closed and slightly ajar, i.e. not latched, on the other side as depicted in FIG. 5 is a high probability situation when push-to-release latches, or the like, are employed as merely lowering the lid 12 will not result in both latches latching.

If it necessary that a particular lid or door be closed and latched with certainty, the prior art approach of FIG. 1 will not work as depicted in FIG. 2. Whether the lid 12 (or one or both sides thereof) is in its closed and latched or its closed and unlatched position, the plunger 16 is depressed and the same signal appears on the wires 18. A mechanical finger or microswitch can sometimes be employed; but, because of the overtravel of the lid 12 in latching and unlatching, such an approach is not reliable and prone to problems of adjustment, mis-adjustment, and going out of adjustment.

A plotter as to be commercially produced by the assignee of this application is such a case in point. Appearing substantially like the simplified drawing of FIG. 5, if both sides of an elongated lid structure are not completely closed and latched prior to operation, paper skew can take place causing mis-operation of certain functions. To try to sense the status of the latches latching the two sides of the lid structure employing any mechanical means can greatly reduce the reliability and mean time between failures of the plotter.

Wherefore, it is an object of this invention to provide a sensing system for doors, lids, and such, latched by push-to-release latches, or the like, which is simple to install and adjust and which is reliable in operation and not prone to going out of adjustment.

It is another object of this invention to provide a way of sensing the status of multiple latches holding doors, lids, and such, shut without physically contacting the latch itself.

It is yet another object of this invention to provide a way of determining the status of a latch without physically contacting the latch itself by sensing the status of a member held by the latch.

Other objects and benefits of the invention will become apparent from the detailed description which follows hereinafter when taken in conjunction with the drawing figures which accompany it.

SUMMARY

The foregoing object has been achieved in a planar closure element revolving about an axis of rotation of a cabinet between open, closed and unlatched, and closed and latched positions relative to a latch which can be closed and unlatched and closed and latched, and wherein the closed and unlatched and closed and latched positions are rotationally displaced from one another, by the apparatus for determining the status of the latch without sensing the latch of the present invention comprising, reflector means carried by one of the planar closure element and the cabinet; non-contacting optical sensor means carried by another of the planar closure element and the cabinet for directing a beam of light from an emitter thereof, for receiving the beam of light as reflected by the reflector means at an input surface of a light detector thereof, and for outputting an electrical signal at an output thereof as a function of light striking the input surface; wherein, the reflector means and the non-contacting optical sensor means are positioned such that the beam of light strikes the reflector means to be reflected thereby at the input surface of the light detector when the closure element is in a closed and latched position and the beam of light does not strike the reflector means to be reflected thereby at the input surface of the light detector when the closure element is in a closed and unlatched position.

In one particular disclosed embodiment, the closure element has a pair of latches at respective ones of a pair of displaced edges of the closure element; the reflector means comprises a pair of reflectors disposed adjacent respective ones of the pair of displaced edges of the closure element; and, the non-contacting optical sensor means comprises a pair of non-contacting optical sensors emitting and sensing reflected light beams disposed adjacent respective ones of the pair of displaced edges of the closure element.

According to one approach, the reflector means is carried by the cabinet and the non-contacting optical sensor means is carried by the closure element.

According to another approach, the reflector means is carried by the closure element and the non-contacting optical sensor means is carried by the cabinet.

Where the closure element is a vertically closing lid having a pair of latches at respective ones of a pair of side edges thereof, the reflector means comprises a pair of reflectors disposed adjacent respective ones of the pair of side edges and the non-contacting optical sensor means comprises a pair of non-contacting optical sensors emitting and sensing reflected light beams disposed adjacent respective ones of the pair of side edges.

DESCRIPTION OF THE DRAWINGS

FIG. 1 is a simplified front view drawing of a cabinet with a raising lid sensed for open or closed conditions by a prior art technique.

FIG. 2 is a simplified front view drawing of a cabinet with a raising lid wherein the lid has closed and unlatched as well as closed and unlatched positions being sensed by the prior art technique of FIG. 1 and depicting the problem which the present invention solves.

FIG. 3 is a simplified front view drawing of the cabinet of FIG. 2 with both the closed and unlatched and closed and unlatched positions being sensed according to the present invention.

DESCRIPTION OF THE PREFERRED EMBODIMENT

Figure 4:
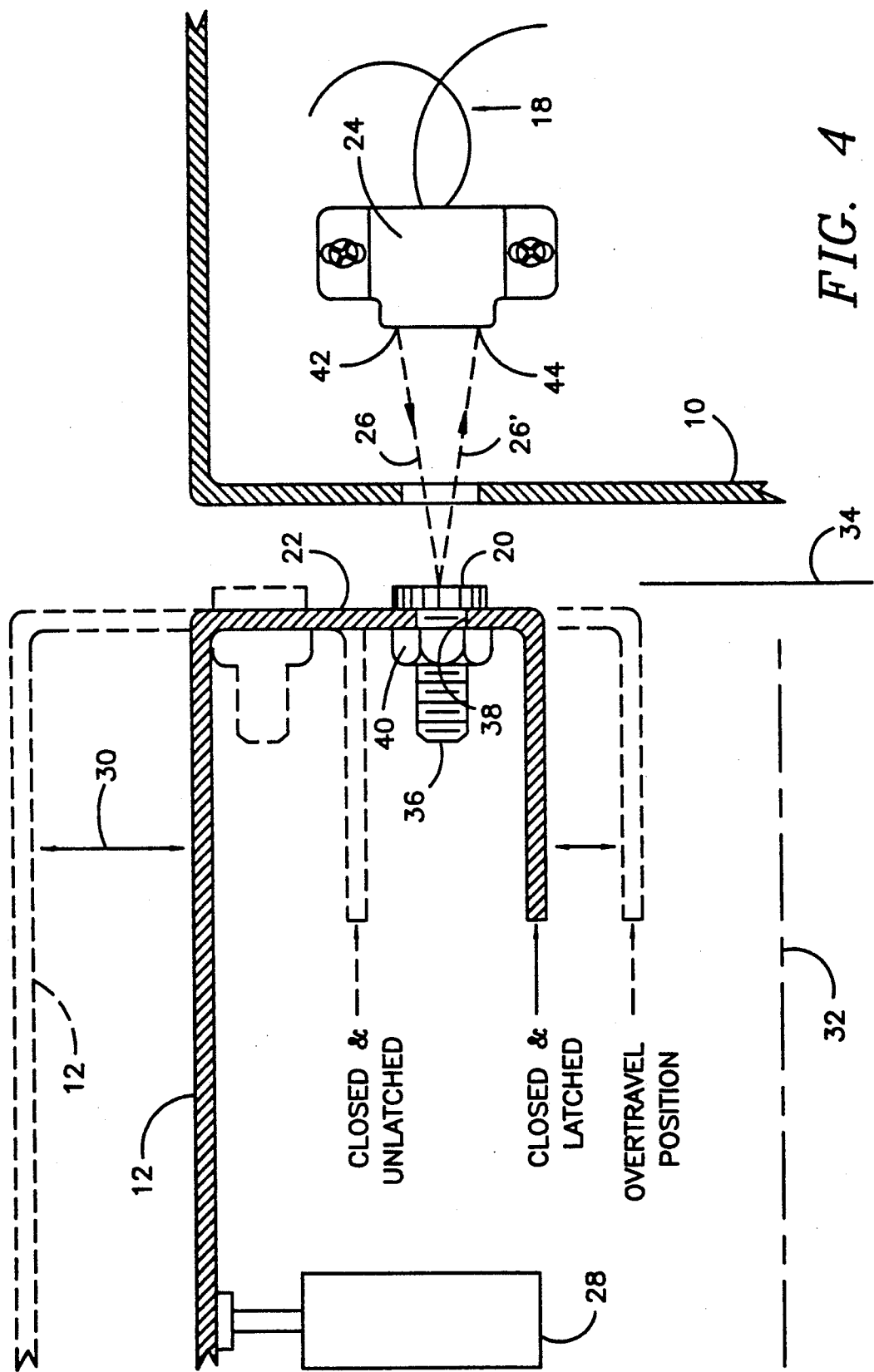
FIG. 4 is an enlarged partially cutaway drawing of a corner of the lid of a cabinet as in FIG. 3 showing the elements of the present invention in greater detail according to one embodiment.

As depicted in FIG. 3 in simplified form, the object of the present invention has been achieved in one embodiment by mounting a reflector 20 on a side edge 22 of the lid 12 lying in a plane of movement of the lid 12 as it moves between its various positions (i.e. in a plane perpendicular to the axis of rotation). A non-contacting optical sensor 24 is positioned to direct a beam of light 26 at the position occupied by the reflector 20 when the lid 12 is in its closed and latched position. The size of the reflector 20 and its position on the side edge 22 of the lid 12 are chosen so that the beam of light 26 does not strike the reflector 20 when the lid 12 is in its closed and unlatched (i.e. ghosted) position. Thus, when the lid 12 is in its closed and latched position, the reflector 20 reflects the beam of light 26' back to the optical sensor 24, where it is detected to produce an output on the wires 18. Such self-contained non-contacting optical sensors are, of course, well known in the art and used in many instances where it is impossible to physically contact a device or article to be sensed. The entirety of the novelty of this invention resides in employing the non-contacting optical sensor 24 to sense a very small area of the side edge 22 of the lid 12 in order to reliably determine the status of the latch (latched or unlatched) without any sensing of the latch itself. The same approach could, of course, be employed if a push-to-release latch is employed to securely hold a door in its closed position.

The present invention and its manner of sensing the latched or unlatched status of a push-to-release latch without contacting the latch itself is shown in greater detail in FIG. 4. The push-to-release latch is symbolically shown by the box 28. The lid 12 moves vertically up and down as indicated by the arrows 30 about a horizontal axis of rotation 32. Thus, the side edge 22 moves in a plane 34 perpendicular to the axis of rotation 32. The three possible positions of the lid 12 in its generally closed position are shown and labeled in the drawing figure. They comprise a CLOSED & UNLATCHED, a CLOSED & LATCHED, and an OVERTRAVEL position. The reflector 20 is mounted on the end of a bolt 36 which is passed through a hole 38 in the side edge 22 and held in place by a nut 40. If desired, the reflector 20 can comprise a highly polished surface on the end of the bolt 36. As depicted in FIG. 4, the non-contacting optical sensor 24 is mounted in the cabinet 10 and vertically positioned (as the figure is viewed) to direct the beam of light 26 from its emitter at 42 at the position occupied by the reflector 20 when the lid 12 is in its closed and latched position. The non-contacting optical sensor 24 is also horizontally positioned (as the figure is viewed) such that the beam of light 26' reflected by the reflector 20 strikes the sensor 44 of the non-contacting optical sensor 24. As can be seen clearly from the drawing of FIG. 4, when the push-to-release latch 28 holding the lid 12 is in its closed and unlatched position (or anything but closed and latched for that matter), the reflector 20 is incapable of reflecting the beam of light 26 and an "unlatched" condition is output on the wires 18 by the non-contacting optical sensor 24. Only when the push-to-release latch 28 holding the lid 12 is in its critical closed and latched position will the non-contacting optical sensor 24 output a "latched" signal on the wires 18.

Figure 5:
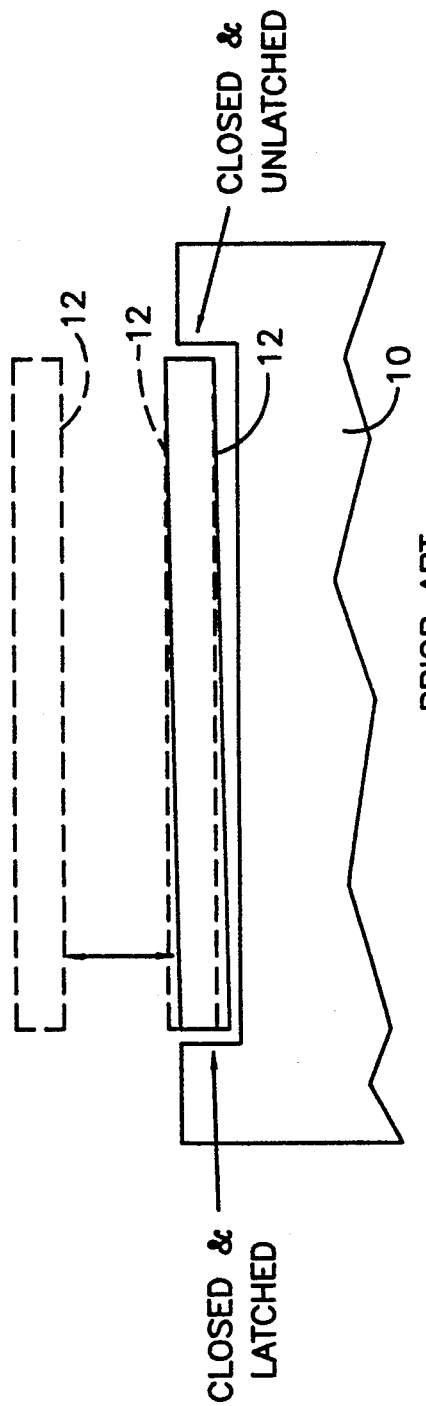
FIG. 5 is a simplified front view drawing of a cabinet with a raising lid wherein the lid has closed and unlatched as well as closed and unlatched positions depicting a lid skewing problem which the present invention solves.
Figure 6:
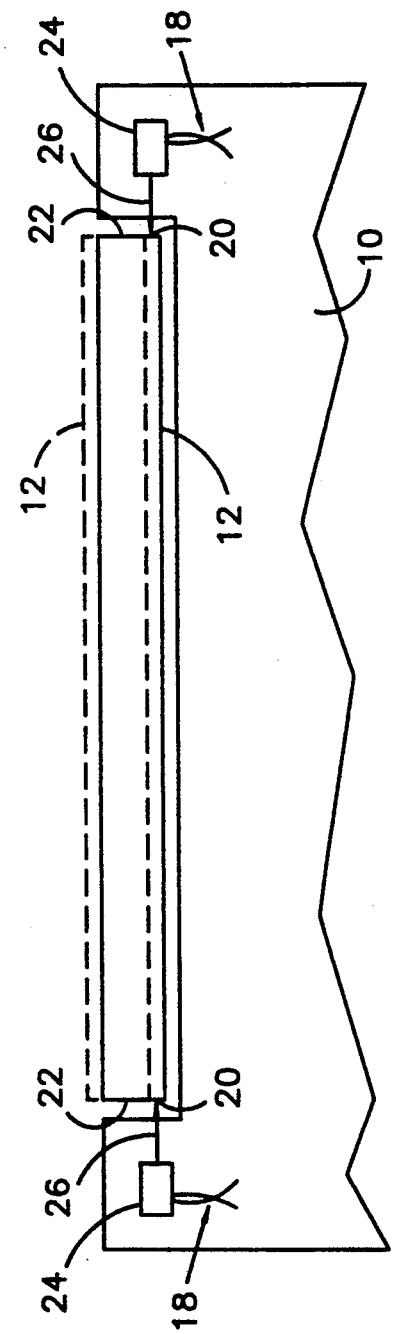
FIG. 6 is a simplified front view drawing of the cabinet of FIG. 5 with the latched/unlatched status of ends of the lid being sensed according to the present invention in the embodiment of FIG. 4.

To solve the lid "skewing" problem depicted in FIG. 5 wherein one side of the lid 12 is closed and latched and the other side is closed but not latched, the approach of FIG. 6 can be employed. In this case, there is a sensor 24 and a reflector 20 for each side of the lid 12. In other words, according to the present invention, the status of multiple latches can be sensed by employing a sensor 24 and a reflector 20 to sense the status of an adjacent area of the member being latched by each of the multiple latches. This, of course, is only possible where the latched member assumes two separate and sensible positions corresponding to the closed and latched and the closed but not latched positions of a latch to be indirectly sensed.

Figure 7:
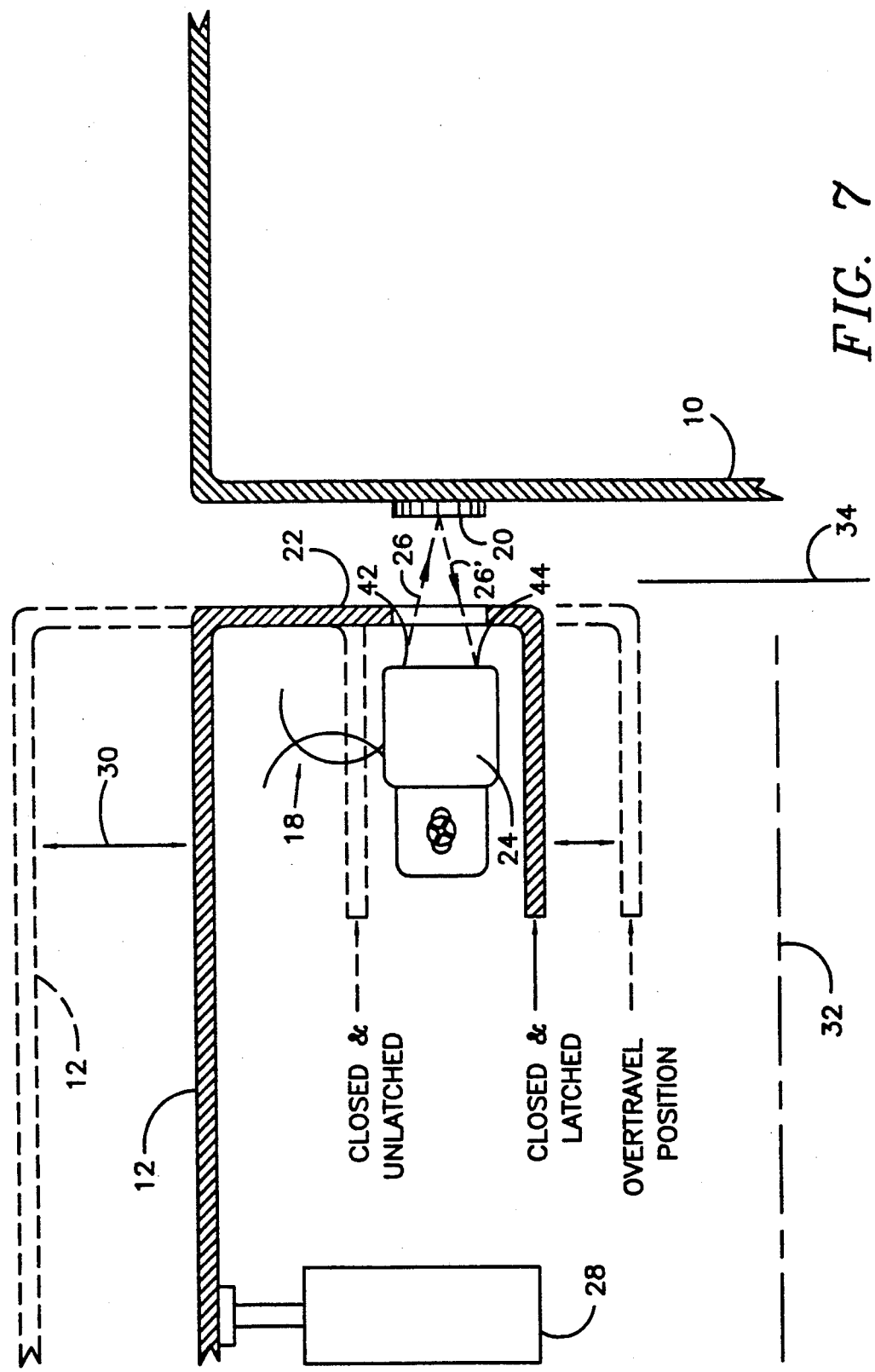
FIG. 7 is an enlarged partially cutaway drawing of a corner of the lid of a cabinet as in FIG. 3 or FIG. 5 showing the elements of the present invention in greater detail according to a second embodiment.

The present invention and its manner of sensing the latched or unlatched status of a push-to-release latch, or the like, without contacting the latch itself according to an alternate embodiment is shown in greater detail in FIG. 7. In this case, the reflector 20 is fixed to the cabinet 10 and the sensor 24 moves with the lid 12. In an alternate approach, the reflector 20 is adhesively mounted to an appropriate fixed point of a vertical surface of the cabinet 10 rather than on the end of a bolt 36 as in the previous embodiment. As depicted in FIG. 7, the non-contacting optical sensor 24 is mounted in the lid 12 and positioned to direct the beam of light 26 from its emitter at 42 at the position occupied by the reflector 20 when the lid 12 is in its closed and latched position. The non-contacting optical sensor 24 is also positioned such that the beam of light 26' reflected by the reflector 20 strikes the sensor 44 of the non-contacting optical sensor 24 as in the prior approach. As can be appreciated from the drawing of FIG. 7, when the push-to-release latch 28 holding the lid 12 is in its closed and unlatched position (or anything but closed and latched for that matter), the reflector 20 is incapable of reflecting the beam of light 26 an an "unlatched" condition is output on the wires 18 by the non-contacting optical sensor 24. Only when the push-to-release latch 28 holding the lid 12 is in its critical closed and latched position will the non-contacting optical sensor 24 output a "latched" signal on the wires 18.

Wherefore, having thus described the present invention, what is claimed is:

1. In a planar closure element revolving about an axis of rotation between open, closed and unlatched, and closed and latched positions relative to a latch which can be closed and unlatched and closed and latched, and wherein the closed and unlatched and closed and latched positions are rotationally displaced from one another, apparatus for determining the status of the latch without sensing the latch comprising:
   a) reflector means disposed on a surface of the closure element in a plane perpendicular to the axis of rotation for reflecting a light beam, said reflector means being located at a position on said surface which moves in said plane between a first position when the closure element is in a closed and unlatched position and a second position when the closure element is in a closed and latched position; and,
   b) non-contacting optical sensor means not carried by the closure element for directing a beam of light from an emitter thereof at said first position, being positioned to receive said beam of light as reflected by said reflector means at an input surface of a light detector thereof, and for outputting an electrical signal at an output thereof as a function of light striking said input surface; wherein,
   c) said first position and said second position are displaced from one another a distance such that said beam of light is not reflected by said reflector means at said input surface when the closure element is in said closed and unlatched position whereby the status of the latch is directly related to said output of said non-contacting optical sensor means.

2. In a planar closure element revolving about an axis of rotation between open, closed and unlatched, and closed and latched positions relative to a latch which can be closed and unlatched and closed and latched, and wherein the closed and unlatched and closed and latched positions are rotationally displaced from one another, apparatus for determining the status of the latch without sensing the latch comprising:
   a) reflector means disposed on a surface adjacent to a path of movement of the closure element in a plane perpendicular to the axis of rotation for reflecting a light beam; and,
   b) non-contacting optical sensor means carried by the closure element for directing a beam of light from an emitter thereof at said reflector means when the closure element is in a closed and latched position, for receiving said beam of light as reflected by said reflector means at an input surface of a light detector thereof, and for outputting an electrical signal at an output thereof as a function of light striking said input surface; wherein,
   c) said reflector means is located at a position such that when the closure element is in a closed and unlatched position said beam of light is not reflected by said reflector means at said input surface.

3. In a planar closure element revolving about an axis of rotation of a cabinet between open, closed and unlatched, and closed and latched positions relative to a latch which can be closed and unlatched and closed and latched, and wherein the closed and unlatched and closed and latched positions are rotationally displaced from one another, apparatus for determining the status of the latch without sensing the latch comprising:
   a) reflector means carried by one of the planar closure element and the cabinet;
   b) non-contacting optical sensor means carried by another of the planar closure element and the cabinet for directing a beam of light from an emitter thereof, for receiving said beam of light as reflected by said reflector means at an input surface of a light detector thereof, and for outputting an electrical signal at an output thereof as a function of light striking said input surface; wherein, c) said reflector means and said non-contacting optical sensor means are positioned such that said beam of light strikes said reflector means to be reflected thereby at said input surface of said light detector when the closure element is in a closed and latched position and said beam of light does not strike said reflector means to be reflected thereby at said input surface of said light detector when the closure element is in a closed and unlatched position.

4. The apparatus for determining the status of a latch without sensing the latch of claim 3 wherein:

a) the closure element has a pair of latches at respective ones of a pair of displaced edges of the closure element;

b) said reflector means comprises a pair of reflectors disposed adjacent respective ones of said pair of displaced edges of the closure element; and, c) said non-contacting optical sensor means comprises a pair of non-contacting optical sensors emitting and sensing reflected light beams disposed adjacent respective ones of said pair of displaced edges of the closure element.

5. The apparatus for indicating the status of a latch without sensing the latch of claim 3 wherein:

a) said reflector means is carried by the cabinet; and, b) said non-contacting optical sensor means is carried by the closure element.

6. The apparatus for indicating the status of a latch without sensing the latch of claim 3 wherein:

a) said reflector means is carried by the closure element; and, b) said non-contacting optical sensor means is carried by the cabinet.

7. The apparatus for determining the status of a latch without sensing the latch of claim 4 wherein:

a) the closure element is a vertically closing lid having a pair of latches at respective ones of a pair of side edges thereof;

b) said reflector means comprises a pair of reflectors disposed adjacent respective ones of said pair of side edges; and, c) said non-contacting optical sensor means comprises a pair of non-contacting optical sensors emitting and sensing reflected light beams disposed adjacent respective ones of said pair of side edges.

8. The apparatus for indicating the status of a latch without sensing the latch of claim 7 wherein:

a) said reflector means is carried by the cabinet; and, b) said non-contacting optical sensor means is carried by the lid.

9. The apparatus for indicating the status of a latch without sensing the latch of claim 7 wherein:

a) said reflector means is carried by the lid; and, b) said non-contacting optical sensor means is carried by the cabinet.

10. In a push-to-release latch connected to a door/lid revolving about an axis of rotation of a cabinet between open, closed and unlatched, and closed and latched positions wherein the closed and unlatched and closed and latched positions are rotationally displaced from one another, apparatus for determining the status of the latch without sensing the latch comprising:

a) a reflector carried by one of the door/lid and the cabinet;

b) a non-contacting optical sensor carried by another of the door/lid and the cabinet for directing a beam of light from an emitter thereof, for receiving said beam of light as reflected by said reflector at an input surface of a light detector thereof, and for outputting an electrical signal at an output thereof as a function of light striking said input surface; wherein, c) said reflector and said non-contacting optical sensor are positioned such that said beam of light strikes said reflector to be reflected thereby at said input surface of said light detector when the door/lid is in a closed and latched position and said beam of light does not strike said reflector to be reflected thereby at said input surface of said light detector when the door/lid is in a closed and unlatched position.

11. The apparatus for indicating the status of a latch without sensing the latch of claim 10 and additionally comprising:

a) a reflector disposed on a surface of the door/lid in a plane parallel to the axis of rotation for reflecting a light beam, said reflector being located at a position on said surface which moves in said plane between a first position when the door/lid is in a closed and unlatched position and a second position when the door/lid is in a closed and latched position; and, b) a non-contacting optical sensor carried by the cabinet and including means for directing a beam of light from an emitter thereof at said first position, being positioned to receive said beam of light as reflected by said reflector at an input surface of a light detector thereof, and for outputting an electrical signal at an output thereof as a function of light striking said input surface; wherein, c) said first position and said second position are displaced from one another a distance such that said beam of light is not reflected by said reflector at said input surface when the door/lid is in said closed and unlatched position whereby the status of the latch is directly related to said output of said non-contacting optical sensor.

12. The apparatus for indicating the status of a latch without sensing the latch of claim 10 and additionally comprising:

a) a reflector disposed on a surface adjacent to a path of movement of the door/lid in a plane perpendicular to the axis of rotation for reflecting a light beam; and, b) a non-contacting optical sensor carried by the door/lid for directing a beam of light from an emitter thereof at said reflector when the door/lid is in a closed and latched position, for receiving said beam of light as reflected by said reflector at an input surface of a light detector thereof, and for outputting an electrical signal at an output thereof as a function of light striking said input surface; wherein, c) said reflector is located at a position such that when the door/lid is in a closed and unlatched position said beam of light is not reflected by said reflector at said input surface.

13. The apparatus for determining the status of a latch without sensing the latch of claim 10 wherein:

a) the door/lid is a vertically closing lid having a pair of latches at respective ones of a pair of side edges thereof;
b) said reflector comprises a pair of reflectors disposed adjacent respective ones of said pair of side edges; and,
c) said non-contacting optical sensor comprises a pair of non-contacting optical sensors emitting and sensing reflected light beams disposed adjacent respective ones of said pair of side edges.

14. The apparatus for indicating the status of a latch without sensing the latch of claim 13 wherein:
a) said reflector means is carried by the cabinet; and,
b) said non-contacting optical sensor means is carried by the lid.

15. The apparatus for indicating the status of a latch without sensing the latch of claim 13 wherein:
a) said reflector means is carried by the lid; and,
b) said non-contacting optical sensor means is carried by the cabinet.

16. A method of determining the status of a latch connected to a door/lid revolving about an axis of rotation between open, closed and unlatched, and closed and latched positions wherein the closed and unlatched and closed and latched positions are rotationally displaced from one another without sensing the latch comprising the steps of:
a) providing a reflector carried by one of the door/lid and the cabinet;
b) providing a non-contacting optical sensor including a light detector carried by another of the door/lid and the cabinet for directing a beam of light from an emitter thereof;
c) positioning the reflector and the non-contacting optical sensor such that the beam of light strikes the reflector to be reflected thereby at an input surface of the light detector when the door/lid is in a closed and latched position and the beam of light does not strike the reflector to be reflected thereby at the input surface of the light detector when the door/lid is in a closed and unlatched position;
d) emitting the beam of light from the emitter of the optical sensor;
e) receiving the beam of light if reflected by the reflector at the input surface of the light detector; and,
f) outputting an electrical signal as a function of light striking the input surface whereby the status of the latch is directly related to the electrical signal.

17. The method for indicating the status of a latch without sensing the latch of claim 16 and additionally comprising the steps of:
a) disposing the reflector on a surface of the door/lid in a plane parallel to the axis of rotation for reflecting a light beam and at a position on the surface which moves in the plane between a first position when the door/lid is in a closed and unlatched position and a second position when the door/lid is in a closed and latched position; and,
b) disposing the non-contacting optical sensor on the cabinet in a position to direct a beam of light at the first position and to receive the beam of light as reflected by the reflector at the input surface of the light detector thereof.

18. The method for indicating the status of a latch without sensing the latch of claim 16 and additionally comprising the steps of:
a) disposing the reflector on a surface adjacent to a path of movement of the door/lid in a plane perpendicular to the axis of rotation; and,
b) disposing the non-contacting optical sensor on the door/lid to direct a beam of light at the reflector when the door/lid is in a closed and latched position and to receive the beam of light as reflected by the reflector at the input surface of the light detector thereof.

19. The method for determining the status of a latch without sensing the latch of claim 16 wherein:
a) the door/lid is a vertically closing lid having a pair of latches at respective ones of a pair of side edges thereof; and additionally comprising the steps of:
b) disposing a pair of reflectors adjacent respective ones of the pair of side edges; and,
c) disposing a pair of non-contacting optical sensors emitting and sensing reflected light beams adjacent respective ones of the pair of side edges whereby skew from one of said pair of latches being latched and another of said pair of latches being unlatch can be detected.

20. In a lid latched at a pair of side edges and revolving about a horizontal axis of rotation between open, closed and unlatched, and closed and latched positions wherein the closed and unlatched and closed and latched positions are rotationally displaced from one another, a method of determining the status of both of a pair of latches releasably latching the lid without physically sensing either of the pair of latches comprising the steps of:
a) providing a pair of reflectors carried by one of the lid and the cabinet adjacent respective ones of the pair of latches;
b) providing a pair of non-contacting optical sensors each including a light detector carried by another of the lid and the cabinet adjacent respective ones of the pair of latches for directing a beam of light from an emitter thereof;
c) positioning each of the pair of reflectors and the pair of non-contacting optical sensors such that the beam of light strikes the reflector to be reflected thereby at an input surface of the light detector when the lid adjacent an associated latch is in a closed and latched position and the beam of light does not strike the reflector to be reflected thereby at the input surface of the light detector when the lid adjacent the associated latch is in a closed and unlatched position;
d) emitting the beam of light from the emitter of the optical sensors;
e) receiving the beam of light if reflected by the reflector at the input surface of the light detectors; and,
f) outputting electrical signals as a function of light striking the input surfaces whereby the status of the latches is directly related to the electrical signals.

* * * * *